March 5, 1963 J. U. THOMA 3,079,870
AXIAL PISTON HYDRAULIC UNITS
Filed July 22, 1959
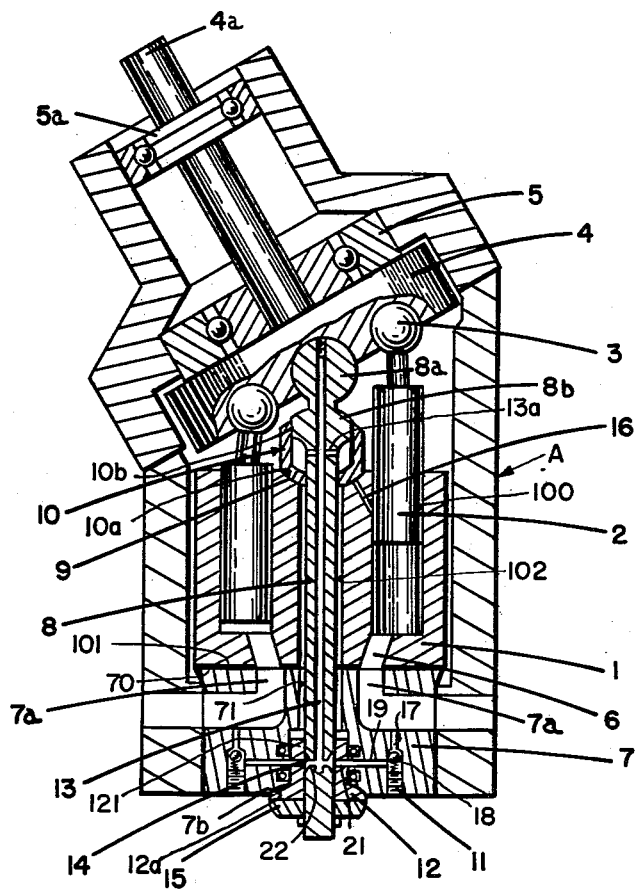
Jean U. Thoma INVENTOR.
BY *Allen A. Wicke*
Attorney

United States Patent Office 3,079,870
Patented Mar. 5, 1963

3,079,870
AXIAL PISTON HYDRAULIC UNITS
Jean U. Thoma, Zollikon, Switzerland
(Bellevueweg 23, Zug, Switzerland)
Filed July 22, 1959, Ser. No. 828,803
Claims priority, application Switzerland July 28, 1958
5 Claims. (Cl. 103—162)

The invention is applicable to devices of the general type disclosed, for example, in Thoma U.S. Patent 2,155,455, April 25, 1939 and Vickers 2,284,109, May 26, 1942, although it is applicable also to other types of construction. In such devices, it is desirable that the cylinder carrier, which may be in the form of a cylinder block as shown in said mentioned patents, is constantly pressed into engagement with the valve plate. It is, of course, important that the forces pressing the cylinder carrier against the valve plate be so distributed that edge pressure is avoided since such edge pressure will cause excessive pressure, wear and heating near the edge of the cylinder carrier. Such edge pressure does not occur when the cylinder ports and valve ports (such as 50 and 48 respectively in the Vickers patent), are located in line with the center of the cylinder area. However, if these ports are located inwardly from the center of the cylinders as the ports 46 in FIG. 2 of Thoma United States Patent 2,155,455 such edge pressure will result in heating and wear at extremely high speeds and pressures unless appropriate steps are taken to overcome this difficulty. One way to accomplish this is by the use of a construction such as shown in Hans Thoma Canadian Patent 544,167 July 30, 1957. In said patent, the valve plate is given a convex shape so that the forces resulting from the oil under pressure in the cylinder act along a line at right angles to the valve plate surface rather than along two spaced lines forming a force couple which will be the case if a flat valve plate is used as in the Thoma United States patent mentioned.

There are, however, important manufacturing advantages which make the use of a planar valve plate surface advisable. It is, therefore, an object of the present invention to provide in such an hydraulic unit, having a plane or planar valve plate surface and having cylinder ports arranged inwardly of the cylinder axes, means for applying axial forces between the cylinder carrier and the valve plate so applied as to overcome any edge pressure therebetween.

Another object is to provide a central pivot pin, carried by the valve plate of such a unit, whether of the type having a fixed or a variable cylinder inclination, which pin serves as an axis upon which the cylinder carrier may rotate and which pin also is supported through a universal joint connection in the driving flange to which the pistons are connected and which central pivot also serves to apply longitudinal forces acting to force the cylinder carrier onto the valve plate.

Another object is to accomplish this result by means of a balancing piston operating in a cylinder, said piston and cylinder being located outwardly of the cylinder block and bearing against a seat or shoulder on the cylinder block and serving, when subjected to oil pressure, to force the cylinder block onto the valve plate.

Another object of the invention is to provide such a construction in which the central pin rotates with the cylinder block so as to eliminate relative rotative movement therebetween and to reduce relative rotative movement between the central pin and the driving flange to a minimum. In that connection, it is also an object to provide a suitable thrust bearing between the central pin and the valve plate carrier to provide for relative rotative movement therebetween.

In such constructions, the distribution or valve surfaces which are under pressure are designed a little smaller than the surfaces of the working pistons under pressure. Unfortunately this leads to relatively small valve areas and therefore to narrow valve ports.

Another object of the present invention is to provide a compact construction which at the same time allows relatively large valve ports and provides an accurate kinematical guiding of the cylinder block.

Another object is to provide such a unit in which the central pivot is provided with a balancing cylinder and piston outward of the cylinder block and adjacent to the piston driving flange which transmit through a suitable abutment longitudinal forces from the central pivot to the cylinder block, which construction permits making the valve ports of the working cylinders (and the kidney shaped intake and delivery ports of the valve plate) relatively large without incurring the danger of lifting the self-sealing cylinder block from the valve plate.

Another object is to provide a slightly movable bushing which serves as a journal for the central pivot and at the same time serves to conduct high pressure oil to the balancing cylinder which bushing is sealed to the valve plate by the use of a flexible seal such as O-rings.

Another object is to provide such a bushing so constructed that high pressure oil leaking past the O-rings can be used for lubrication of an external thrust bearing, by supplying thereto throttled and filtered high pressure oil.

Another object is to provide means for lubricating the abutment between the balancing cylinder and the cylinder block with high pressure oil which may be bled from one or several of the working cylinders. This bleeding may occur through conduits opening into the working cylinders at such points that they are covered during a part or during the whole stroke of the working pistons.

It is another and important object of this invention to provide a hydraulic unit or arrangement of the type referred to above in which the pivot pin, at least in a portion thereof passing through the cylinder block and valve plate, has less diameter than the diameter of the bores through the cylinder block and valve plate, the balancing cylinder includes a base having a spherical surface engaging with a spherical seat on the cylinder block, the valve plate has a spherical seat at a portion remote from the cylinder block, a bushing surrounds the central pin and has a spherical surface engaging with the seat on the valve plate and a thrust washer or means is secured to the pin and in engagement with the bushing whereby the arrangement accommodates minute angular deviations between the pivot pin and the cylinder block or between the pivot pin and the valve plate without disturbing the intimate contact between the base of the cylinder block and the facing surface of the valve plate.

Further objects and advantages of this invention will be apparent from consideration of the specification as illustrated by the accompanying drawing of possible embodiments of the invention, which drawing shows an axial piston unit (pump or motor) having the cylinder block 1 provided with working cylinders each containing a working piston 2 each of which pistons are connected in known manner as by ball-ended connecting rods 3 to the driving flange 4, whose axis of rotation is inclined to the axis of rotation of the cylinder block. The driving flange 4 and the shaft 4a attached thereto are mounted in ball bearings 5 and 5a. The intake and delivery of the fluid is effected by the usual cylinder port 6 passing over the usual kidney segmentally shaped entry and delivery ports 7a formed in the valve plate 7. It should be noted that the valve plate 7 is drawn revolved about 90 degrees around its axis to show the valve ports 7a.

A central pivot pin 8 is journalled in the valve plate 7 at its lower end and may also be journalled in the driving flange 4 by means of the ball joint 8a. Said central pivot 8 guides the cylinder block radially through the spherical abutment surface 9 on the cylinder block being engaged by a mating spherical external surface 10a on the lower end or base of the cup shaped balancing cylinder 10 within which slides the piston 8b shown formed as an enlarged portion of the central pivot or means 8. Longitudinal forces are therefore transmitted to the cylinder block 1 through downward action of the balancing cylinder 10 acting on abutment or seat 9. The reaction forces are transmitted through tension in central pivot pin 8. These forces are proportional to the difference in cross-sectional area between the central pivot pin 8 and the enlarged portion or part 8b, the effect being that of a differential piston. These additional longitudinal forces act to press the cylinder block 1 against the valve plate 7, thus making it possible to design the cylinder ports 6 reasonably large without danger of lifting the cylinder block 1 away from the valve plate.

The balancing cylinder 10 may be fed by high pressure oil which is conducted from the main pressure conduits via the check valves 11 into the longitudinal oil-accommodating bore 13 in the central pivot 8 and from there by small radial bores or ports 13a into the balancing cylinder 10. The longitudinal forces generated by the fluid in the expansion cylinder are transmitted by the outer thrust bearing 15 onto the valve plate 7.

While the construction described above comprises a very advantageous design, further improvements can be achieved by the structure illustrated in which the central pivot 8 is journalled in a bushing 12 rather than directly in the valve plate 7, the pivot 8 has less diameter than the diameter of the central bore in the valve plate 7, and there is a spherical seat 7b on the valve plate and a co-operating spherical surface 12a on the bushing whereby a limited angular movement may be accommodated between the pivot 8 and the valve plate 7. The cylindrical part 12b non-rotating bushing 12 fits somewhat loosely in the valve plate to permit this slight movement and is sealed by means of the O-rings shown. This compensates for certain inaccuracies in the position of the driving flange relative to the other parts which is of great advantage especially with pumps having variable inclination of said driving flange for varying the displacement.

The flow of the high pressure oil from the inlets passes through axial bores or passages 17 in the valve plate 7, past check valves 18, thence through radial bores 19 in the valve plate and radial bores 21 in the non-rotating bushing to the longitudinal bore 13 in central pivot 8 via an external annular groove 14 in the pivot 8 and radial bores or ports 22 in pivot 8. Thus oil flows into the oil-accommodating bore 13 regardless of any relative rotary positions between pin 8 and bushing 12. At least some oil escapes along pin 8 and passes between the thrust bearing or washer 15 and the bushing 12 so as to sufficiently lubricate the facing thrust bearing surfaces. This leakage is strongly throttled and filtered in the clearance space between the central pivot 8 and the bushing 12. This is of great importance for the load capacity and life of the thrust bearing 15.

It is also of advantage to provide lubrication between the expansion or balancing cylinder 10 and the spherical abutment surface or seat 9 on the cylinder block 1. Said parts may be lubricated by providing ports or bores such as 16 drilled into one or more of the working cylinders. The bores or ports 16 extend between the working cylinder and the enlarged spherical portion of the bore through the cylinder block. By placing the openings of the ports 16 in the working cylinder walls in such a way that said openings are covered by the working pistons 2 during part or all of their stroke efficient throttling and filtering of the lubricating oil is provided.

The axial piston pump thus described has the great advantage that the cylinder block is completely kinematically suspended. This means that distance and angular position of the cylinder block relative to the valve plate is only determined by the valve surfaces themselves, which will therefore be, even with inaccurate manufacture or distortions of all other parts, in intimate contact with each other and therefore produce only low leakage losses. The very slightly adjustable guiding of the cylinder block on the central pivot thereby transmits the remaining forces in such a way, that the precise self-adjusting and self-sealing of the cylinder block on the valve surface is not disturbed and that deviations and inaccuracies of the position of the driving flange have only little effect on the position of the connecting rods.

It is therefore clear that the present invention provides a structural arrangement of a hydraulic unit that includes a casing A within which a cylinder block 1 is mounted for rotation. This cylinder block is provided with a plurality of axially extending bores therein each defining a working cylinder 100. A working piston 2 is disposed within each bore. As is conventional the connecting rods of the pistons have a ball-shaped end 3 so as to make a ball connection with a driving flange 4 mounted for rotation about an axis at an angle to the axis of the cylinder block whereby rotation of the driving flange reciprocates the pistons in the working cylinders and rotates the cylinder block within the casing. The cylinder block which includes a base having a planar outer surface 101 and ports 6 are provided in the inwardly of the axes of the working cylinders and in communication with said cylinders. Valve plate 7 is fixedly mounted within the casing A and has a planar surface 70 facing and engaging the planar surface 101 of the cylinder block. The valve plate has inlet passage ways or ports 6 including segmentally shaped admission and delivery ports 7a that open in the planar surface 70 of the valve plate and are adapted to register with the ports 6 in the base of the cylinder block upon relative rotation between the cylinder block and the valve plate. The cylinder block and valve plate each have a centrally disposed axially extending bore therethrough as shown at 102 and 71. The axes of these bores are coincident with the axis of the cylinder block. The bore through the valve plate includes an enlarged portion remote from the cylinder block and defined by a portion of the valve plate shaped as a segment of a sphere so as to constitute a seat 7b. The bore in the valve plate also has an enlarged portion of an intermediate diameter that is disposed inwardly from the seat 7b. The bore through the cylinder block has an enlarged portion disposed inwardly from the face thereof remote from the valve plate and defined by a portion of the cylinder block shaped as a segment of a sphere and constituting another seat 9. A pivot pin or means 8 is disposed through the bores in the cylinder block and valve plate with the surface portion of this pin that face said bores having less external diameter than the diameter of the bores. A ball joint connection 8a couples the pivot pin to the driving flange 4. Further this pivot pin has a portion 8b of increased diameter externally of the cylinder block and positioned between the cylinder block and the driving flange. A cup-shaped balancing piston is provided between the cylinder block and the pin 8. This balancing piston 10 includes a base and a wall portion 10b in sliding engagement with the enlarged portion 8b of the pin. The base of the cylinder block has an external surface 10a defined by a segment of a sphere corresponding to and engaging with the seat 9 on the cylinder block. A bushing 12 surrounds the central pin and includes a cylindrical portion 121 that is positioned within the portion of the bore through the valve plate of intermediate diameter and has less diameter than such portion of the bore so as to fit loosely therewithin. At least a part of the bushing 12 is provided with an external surface 12a corresponding to and engaging with the seat 7b on the valve plate. A thrust washer 15 is carried by the pin 8 and has a bearing surface in facing and in engagement with the bushing 12. Further the pin 8 has a longitudinal oil-accommodating bore 13 therein and radial ports 13a extending from said bore and communicating with the space between the pin and the wall portion of the balancing piston 10. The valve plate, bushing and pin are also provided with bores 17 and 19, 21 and 22 respectively to provide communication between the inlet passages or ports in the valve plate and the bore 13 in the pin 8 via groove 13 so that oil under pressure can flow through the pin to the interior of the balancing cylinder to apply axial thrust against the cylinder block towards the base thereof into intimate planar contact with the valve plate. The reaction of this axial thrust is absorbed by the thrust washer 15. Furthermore, the co-operating spherical surfaces of the seat 9 on the cylinder block and the surface 10a on the base of the balancing cylinder and of the portion or seat or surface 12a of the bushing and the seat 7b on the valve plate accommodate minute angular deviation between the pin and the cylinder block and pin and valve plate respectively without disturbing such intimate planar contact.

While I have herein shown and described only certain embodiments of certain features of my present invention, it is to be understood that they are to be regarded merely as illustrative and that I do not intend to limit myself thereto except as may be required by the following claims:

I claim:

1. In an hydraulic unit of the type including a casing, a cylinder block mounted for rotation within the casing, said cylinder block having a plurality of axially extending bores therein each defining a working cylinder, a working piston within each bore, a driving flange mounted for rotation about an axis disposed at an angle to the axis of the cylinder block, a piston rod for each piston, means connecting the piston rods to the driving flange whereby rotation of the flange reciprocates said pistons in the working cylinders and rotates said cylinder block within the casing, said cylinder block including a base having ports therein in communication with the respective working cylinders, said base having a planar outer surface, a valve plate fixedly mounted within the casing and having a planar surface facing and engaging the planar surface of the base of the cylinder block, and said valve plate having inlet passageways therethrough including segmentally shaped admission and delivery ports in the planar surface of the valve plate adapted to register with the ports in the base of the cylinder block upon relative rotation between the cylinder block and valve plate, the improvement comprising said cylinder block and valve plate each having an axial bore therethrough having their respective axes coincident with the axis of said cylinder block, the bore through the cylinder block having an enlarged portion disposed inwardly from the face thereof remote from the valve plate and defined by a portion of the cylinder block shaped as a segment of a sphere and constituting a first seat, the bore through the valve plate including an enlarged portion remote from said cylinder block and defined by a portion of the valve plate shaped as a segment of a sphere and constituting a second seat, a pin including a portion extending through the bores in the cylinder block and valve plate, said portion of the pin having less external diameter than the diameters of said bores, means connecting the end of the pin remote from the valve plate to said driving flange to constitute a ball joint connection between the driving flange and the pin, said pin having a portion of increased diameter externally of said cylinder block and positioned between the cylinder block and the driving flange, a cup-shaped balancing cylinder including a base and a wall portion in sliding engagement with said last-mentioned portion of the pin, the base of said balancing cylinder having an external surface defined by a segment of a sphere corresponding to and engaging with said first seat, a bushing surrounding the central pin and positioned between the pin and the enlarged portion of the bore through the valve plate, at least a portion of said bushing having an external surface defined by a segment of a sphere corresponding to and engaging with said second seat, a thrust washer carried by said pin and having a bearing surface in facing engagement with at least a portion of said bushing, said pin having a longitudinal oil-accommodating bore therein and ports extending from said bore and in communication with the space between the pin and the wall portion of the balancing cylinder, said valve plate, bushing and pin also having bores therethrough providing communication between at least one of the ports in the valve plate and the longitudinal oil-accommodating bore in the pin whereby oil under pressure can flow from said at least one port in the valve plate to and through the longitudinal bore in the pin to the interior of the balancing cylinder to apply axial thrust against the cylinder block to urge the base thereof into intimate planar contact with the valve plate, the reaction of said thrust being absorbed by said thrust washer, and the co-operating spherical surfaces of said first seat on the cylinder block and the bore of said balancing cylinder and of said portion of said bushing and said second seat in said valve plate respectively accommodating minute angular deviations between said pin and said cylinder block and between said pin and said valve plate without disturbing the intimate planar contact between the planar outer surface of the base of the cylinder block and the facing planar surface of the valve plate.

2. In an hydraulic unit as claimed in claim 1 and said cylinder block having a bore extending between at least one of said working cylinders from a point covered by the associated working piston during at least a part of its stroke and said enlarged spherical portion of the bore through the cylinder block to provide a flow path for oil from said at least one working cylinder to said enlarged portion for lubricating purpose.

3. In an hydraulic unit as claimed in claim 1 and one of said bushing and pin having an annular groove in the surface thereof providing constant communication between the bores through said pin and bushing and the longitudinal bore in the pin, and regardless of the relative rotary portions thereof.

4. In an hydraulic unit as claimed in claim 1 and in which the bore through the valve plate has a cylindrical portion extending inwardly from the enlarged portion and of an intermediate diameter, said bushing including a cylindrical portion extending axially inwards of the valve plate from said enlarged spherical portion of the bore through the valve plate, said cylindrical portion of the bushing being positioned within said portion of intermediate diameter and of less external diameter whereby said bushing fits loosely within said bore through the valve plate.

5. In an hydraulic unit of the type including a casing, a cylinder block mounted for rotation within the casing, said cylinder block having a plurality of axially extending bores therein each defining a working cylinder, a working piston within each bore, a driving flange mounted for rotation about an axis disposed at an angle to the axis of the cylinder block, a piston rod for each piston, means connecting the piston rods to the driving flange whereby rotation of the flange reciprocates the pistons in the cylinders and rotates said cylinder block within the casing, said cylinder block including a base having ports therein in communication with the respective cylinders, a valve plate fixedly supported within the casing and having a surface in facing engagement with the base of said cylinder block, said valve plate having inlet passages therethrough including segmentally shaped admission and delivery ports in said surface adapted to register with the ports in the base of the cylinder block upon relative rotation between said cylinder block and said valve plate, the improvement comprising said cylinder block and valve plate, each having an axial bore therethrough having their axes coincident with the axis of said cylinder block, a portion of the bore through the cylinder block adjacent said driving flange being spherically shaped to define a first seat constituting a segment of a sphere, a portion of the bore through the valve plate remote from said cylinder block being enlarged and spherically shaped to define a second seat constituting a segment of a sphere, a pin means extending through the bores in the valve plate and cylinder block and having less diameter than the diameter of said bores, a ball-joint connection between the end of the pin means remote from the valve plate and the driving flange, a cup-shaped balancing cylinder positioned between the pin means and the cylinder block and including a wall portion in co-operative sliding engagement with a portion of the pin means and a base having an external surface defined by a segment of a sphere corresponding to and engaging with said first seat on the cylinder block, a bushing surrounding said pin and having a spherical portion engaging said second seat on the valve plate, a thrust washer carried by the pin and having a bearing surface in engagement with said bushing, said pin having a longitudinal oil-accommodating bore therethrough, at least a part of said wall portion of said balancing cylinder being spaced from a portion of the pin means, said pin means having radial ports providing communication between said longitudinal bore and the space between the pin means and said part of the wall portion of said balancing cylinder, said valve plate, bushing and pin means having bores therethrough providing communication between at least one of said ports in the valve plate and the longitudinal oil-accommodating bore in the pin whereby oil under pressure can flow from said at least one port in the valve plate to and through the longitudinal bore in the pin means and thence through said radial ports therein to the interior of the balancing cylinder to apply axial thrust against said cylinder block in a direction toward said valve plate, and the reaction of said thrust being absorbed by said thrust washer whereby minute angular deviations between said cylinder block and said pin means and between said pin means and said valve plate respectively can be accommodated without disturbing the contact between the base of the cylinder block and the facing surface of the valve plate.

References Cited in the file of this patent

UNITED STATES PATENTS

| | | |
|---|---|---|
| 1,163,849 | Pratt | Dec. 14, 1915 |
| 1,299,751 | Magie | Apr. 8, 1919 |
| 1,308,844 | Ferris et al. | July 8, 1919 |
| 2,257,724 | Bennetch | Oct. 7, 1941 |
| 2,297,518 | Wegerdt | Sept. 29, 1942 |
| 2,900,921 | Brown | Aug. 25, 1959 |

FOREIGN PATENTS

| | | |
|---|---|---|
| 760,783 | Germany | Apr. 16, 1953 |
| 820,242 | Germany | Nov. 8, 1951 |

OTHER REFERENCES

German application 1,003,039, printed February 21, 1957 (K1.59a–14).